(12) United States Patent
Wester et al.

(10) Patent No.: US 6,827,964 B2
(45) Date of Patent: Dec. 7, 2004

(54) EDIBLE FAT BLENDS

(75) Inventors: Ingmar Wester, Raisio (FI); Juha Orte, Nousiainen (FI)

(73) Assignee: Raisio Benecol Ltd., Raisio (FI)

( * ) Notice: Subject to any disclaimer, the term of this patent is extended or adjusted under 35 U.S.C. 154(b) by 0 days.

(21) Appl. No.: 10/368,413

(22) Filed: Feb. 20, 2003

(65) Prior Publication Data

US 2003/0170369 A1 Sep. 11, 2003

Related U.S. Application Data

(62) Division of application No. 09/956,144, filed on Sep. 20, 2001, now Pat. No. 6,562,395, which is a continuation of application No. 09/436,001, filed on Nov. 8, 1999, now abandoned.

(30) Foreign Application Priority Data

Nov. 5, 1999 (FI) .................................................. 992402

(51) Int. Cl.[7] .............................................. A23D 9/007
(52) U.S. Cl. ........................ 426/611; 426/601; 552/544
(58) Field of Search ................................ 426/601, 611; 552/544

(56) References Cited

U.S. PATENT DOCUMENTS

| | | |
|---|---|---|
| 3,751,569 A | 8/1973 | Erickson |
| 3,852,311 A | 12/1974 | Nicholas |
| 3,865,939 A | 2/1975 | Jandacek |
| 4,160,850 A | 7/1979 | Hallstrom |
| 4,218,334 A | 8/1980 | Lundmark |
| 4,391,732 A | 7/1983 | Lundmark |
| 5,089,139 A | 2/1992 | Asbeck |
| 5,244,887 A | 9/1993 | Straub |
| 5,270,041 A | 12/1993 | Eugster et al. |
| 5,502,045 A | 3/1996 | Miettinen et al. |
| 5,843,499 A | 12/1998 | Moreau |
| 5,892,068 A | 4/1999 | Higgins, III |
| 5,958,913 A | 9/1999 | Miettenen et al. |
| 6,025,348 A | 2/2000 | Goto |
| 6,031,118 A | 2/2000 | Van Amerongen |
| 6,087,353 A | 7/2000 | Stewart |
| 6,107,456 A | 8/2000 | Huibers |
| 6,110,502 A | 8/2000 | Burruano |
| 6,113,971 A | 9/2000 | Elmaleh |
| 6,123,978 A | 9/2000 | Dartey |
| 6,139,897 A | 10/2000 | Goto |
| 6,147,235 A | 11/2000 | Helminen |
| 6,158,524 A | 12/2000 | Livingston |
| 6,162,483 A | 12/2000 | Wester |
| 6,174,560 B1 | 1/2001 | Miettinen |
| 6,184,397 B1 | 2/2001 | Roden |
| 6,190,720 B1 | 2/2001 | Yuan |
| 6,562,395 B2 * | 5/2003 | Wester et al. ............... 426/611 |

FOREIGN PATENT DOCUMENTS

| | | |
|---|---|---|
| EP | 1405346 | 9/1975 |
| EP | 0195311 | 9/1986 |
| EP | 0 897 970 A1 | 2/1999 |
| EP | 0 898 896 A1 | 3/1999 |
| EP | 0 911 385 A1 | 4/1999 |
| GB | 1 284 814 A | 7/1970 |
| GB | 1284814 A | 8/1972 |
| WO | WO/ 92/19640 | 11/1992 |
| WO | WO 98/01126 | 1/1998 |
| WO | WO 99/56558 | 11/1999 |
| WO | WO 00/61694 | 10/2000 |

OTHER PUBLICATIONS

"Descriptions and Definitions of Olive Oils and Olive–Residue Oils Referred to in Article 35"; Official Journal of the European Communities, No. L39/2.

Firestone, 1988, JAOCS 65(5) 788–792.

Swern, ed. 1982. Bailey's Industrial Oil and Fat Products, vol. 2, 4th Edition, John Wiley & Sons, p. 317, 382, 383, 416, 417.

Hui, ed. 1996. Bailey's Industrial Oil and Fat Products, vol. 2, 5th Edition, Johan Wiley & Sons, p. 254–267.

Dutta, et al., "Saturated Sterols (Stanols) In Unhydrogenated and Hydrogenated Edible Vegetable Oils and in Cereal Lipids", J. Sci. Food Agric., vol. 71, p. 383–391, 1996.

Schuhmann et al., Method for Qualitative and Quantitative Determination of Phytosterols in Vegetable ols by LC–GC off–line, Mitt. Gebiete Lebensm. Hyg. 87, p. 708–715, 1996.

Dutta, "Sitostanol fatty acid ester content of hydrogenated rapeseed oil" (hydrogenation results).

Raisio Benecol Ltd. "Formation of Sitostanol During Partial and Full Hyudrogenation of Vegetable Soybean Oil with Ni–Catalyst", (hydrogenation results).

Hallikainen et al., "Comparison of the effects of plant sterol ester and plant stanol ester–enriched margarines in lowering serum cholesterol concentrations in hypercholesterolaemic subjects on a low–fat diet", European Journal of Clinical Nutrition vol. 54, p. 715–725. 2000.

Plat et al., "Effects of Low–Fat Yogurt with Plant Stanol Esters and of Consumption Frequency on LDL–Cholesterol Levels", Summary of Presentation at 92nd AOCS Annual Meeting and Expo, May 13–16, 2001, Minneapolis, Minnesota, USA.

PCT Applicant's Guide (Swedish Patent Office as ISA)— Annex D and E.

Opponent's further submissions of Jun. 27, 2000 (including Annexes I–II).

Sugano, et al., "Stanol Components in Edible Fats and Oils", Sci. Bull. Fac. Agr., Kyushu Unvi., vol. 32, No. 1, p. 21–28, 1977.

Ullmann's Encyclopedia of Industrial Chemistry, vol. A16, p. 152–153.

Hiiros et al., "Elintarvike–Tekniikan Perusteet", VAP-K–kustannus, Helsinki, 1990, p. 236–241 (including translation of passage bridging pp. 240–241).

* cited by examiner

Primary Examiner—Carolyn Paden
(74) Attorney, Agent, or Firm—Arent Fox, PLLC

(57) ABSTRACT

Olive oil based products, based on the virgin olive oils, containing plant stanol and/or sterol fatty acid ester blends and methods for preparing such olive oil based products.

19 Claims, No Drawings

EDIBLE FAT BLENDS

This application is a divisional application of U.S. Application Ser. No. 09/956,144, filed Sep. 20, 2001, now U.S. Pat. No. 6,562,395, which is a continuation of U.S. Application Ser. No. 09/436,001, filed Nov. 8, 1999, now abandoned.

BACKGROUND OF THE INVENTION

This invention relates to olive oil based products, based on especially higher grades of olive oils like virgin olive oils, containing plant stanol esters and/or plant sterol esters and methods for preparing such olive oil based products, as well as certain plant stanol and/or sterol esters usable for the preparation of the olive oil based product.

Plant sterols are a group of compounds structurally very similar to cholesterol. The plant sterols occurring most frequently in nature are sitosterol, campesterol and stigmasterol. Vegetable oils and fats are the main source of plant sterols in our diet. In vegetable oils a major part of the sterols exists as fatty acid esters. Saturated plant sterols such as sitostanol and campestanol are present in our diet in small amounts. Daily intake of total stanols in the Finnish diet has been estimated to 30–80 mg/day. However, tall oil sterols contain 10–20% of plant stanols (mainly sitostanol and campestanol). Plant stanols can also be produced by hydrogenation to remove the double bond in corresponding plant sterols.

In recent years, much interest has been focused on the cholesterol-lowering properties of plant stanols and sterols with already many plant stanol or sterol enriched products such as margarines, salad dressings, bars and yogurts commercially available. Based on recent studies, a daily intake of 2–3 g plant stanols or sterols significantly reduces serum LDL cholesterol levels even when used as part of healthy recommended diets. Plant stanol and sterol enriched foods provide an enhanced dietary approach for lowering elevated serum total and LDL cholesterol levels. Enrichment of staple foods with plant stanols and/or sterols in their fatty acid ester forms is possible without compromising on taste or mouthfeel. Based on the cholesterol lowering efficacy and the fact that plant stanols are virtually unabsorbable, plant stanols are more preferable, but also blends of plant stanols and sterols or plant sterols alone can be used.

The best benefit from using plant stanols and/or sterols for lowering elevated serum total and LDL cholesterol levels is obtained when enriching staple foods. For example, in the northern part of Europe, margarine and spreads are very suitable food products for such enrichment, but for the southern part of Europe other staple food candidates need to be found. In this region, olive oil is a staple food of major importance. In addition, olive oil consumption is increasing also in other parts of the world due to the health reputation and the flavour of higher grades of olive oils. Olive oil contains naturally very low levels of plant sterols (typically <0.2 g/100 g oil). In addition higher grade olive oils, such as virgin olive oils, contain quite high amounts of squalene, a precursor of cholesterol. The content of squalene varies, but extra virgin olive oil typically contains about 300 mg/100 g oil. Dietary squalene has been shown to increase serum cholesterol levels in man. Such an effect on serum total and LDL cholesterol levels may be counteracted by plant stanols and/or sterols. Therefore, there is clearly a need to make commercially available higher grade olive oils enriched with plant stanols and/or sterols, and to ensure that such olive oils have similar properties as normally used olive oils.

Virgin olive oils should remain clear when stored at 20° C. for 24 hours. Typically, higher grades of olive oils, such as virgin olive oils, become cloudy with even clear crystallization occuring when stored for a prolonged time at refrigerator temperatures. An olive oil enriched with plant stanols and/or sterols should avoid cloudiness.

For the large-scale production of plant stanol and/or sterol esters, normally common vegetable oils or commercially available edible oils with modified fatty acid compositions are used. Enrichment of higher grades of olive oils, such as virgin olive oils, with plant stanol and/or sterol esters with fatty acids derived from such commercially available vegetable oils or their blends further enhances the precipitation of higher melting lipids at room temperatures and below. The formed crystals do not normally dissolve, even after prolonged storage at room temperatures. This problem cannot be solved, even by using the esterification of stanol and/or sterol fatty acids derived from currently commercially available vegetable oils with high levels of polyunsaturated fatty acids and low levels of saturated fatty acids, such as low saturated soybean oil (PUFA: 67 weight-%, SAFA: 7,9 weight-%), sunflower oil (PUFA: 64 weight-%, SAFA: 12 weight-%) or linola oil (PUFA: 70 weight-%, SAFA 11 weight-%).

U.S. Pat. No. 5,080,139 describes a method for refining virgin olive oil, in which the virgin olive oil is microfiltrated over a microfilter at temperatures from 15 to 35° C. to obtain a virgin olive oil staying bright when subjected to a cold test at 01C. for 24 hours.

U.S. Pat. No. 3,751,569 describes clear cooking and salad oils having hypocholesterolemic properties. Into the liquid glyceride base oil is mixed 0.5–10 weight-% (calculated as free sterols) of a sterol fatty acid ester. The fatty acid moiety is defined as a $C_{1-12}$ saturated monocarboxylic acid moiety or an unsaturated fatty acid with up to 24 carbon atoms. In one embodiment, the sterol fatty acid ester is prepared by perchloric acid catalyzed esterification of commercially-available free sterols with monocarboxylic acid anhydrides. The sterol fatty acid ester is added in an amount small enough to prevent precipitation at refrigerator temperatures. In the exemplified embodiment, the cooking or salad oil was prepared by dissolving a liquid glyceride base oil and a plant sterol monocarboxylic acid ester in a mutual solvent (such as hexane or diethyl ether) and evaporating the solvent. The solubility of different fatty acid esters of plant sterol in triolein are also presented, showing very low solubility for $C_{12}$ (0.6%) and $C_{16}$ (0.1%) saturated fatty acid plant sterol esters. The process and product disclosed in the '569 patent suffers from at least two drawbacks. First, the use of fatty acids prepared from individual commercially-available free sterols is neither practical nor economical, as these starting products are quite expensive. Second, the perchloric acid catalyzed esterification process used in the '569 patent is not a food grade process, as residual chloride remains in the product. Thus, the '569 patent is not suitable for commercial applications.

GB Patent 1 405 346 teaches a process by which free sterols naturally contained in edible oils and fats are converted to fatty acid esters via an interesterification process. In addition, in Example 2 a method for producing vegetable oils with elevated sterol ester contents is described. However, the method taught is based on the interesterification of the entire oil blend, which based on physical properties cannot be executed for higher grades of commercial olive oils, such as virgin olive oils.

SUMMARY OF THE INVENTION

Saturation of a plant sterol blend to a corresponding plant stanol blend causes marked differences in the melting properties of the corresponding sterol/stanol esters with the same fatty acid composition. For example, vegetable oil based sterol ester with low erucic acid content, rapeseed oil fatty acids and corresponding stanol fatty acid ester showed the following amounts of solid fat contents (weight- % of total fat) at different temperatures as measured by NMR-technique:

|  | 10° C. | 20° C. | 30° C. | 35° C. | 40° C. |
|---|---|---|---|---|---|
| plant sterol | 40.5 | 11.6 | 3.5 | 1.7 | 1.1 |
| plant stanol | 82.3 | 70.2 | 34.9 | 9.4 | 5.2. |

The physical properties of stanol and/or sterol fatty acid esters can be tailor-made by changing the fatty acid composition of the fatty acid ester or by using different ratios of plant stanols and sterols in the ester.

In the present invention the problem with the precipitation/crystallisation of higher melting lipids in higher grade olive oils is overcome by dissolving plant stanol and/or sterol fatty acid esters with fatty acids derived from so-called high PUFA vegetable oils in higher grade olive oils, such as virgin olive oils, and crystallising any higher melting lipids from the olive oil at temperatures in the range from refrigerator temperatures to room temperatures to obtain a plant stanol and/or sterol fatty acid ester blend with a very low content of saturated fatty acid esters contained in the olive oil. The crystallisation temperature and time needed is dependent on the amount and type of stanol and/or sterol fatty acid ester used. By choosing the crystallisation temperature and time properly, the virgin olive oils either stay clear at refrigerator temperatures or become clear when the oil is removed from refrigeration and kept at room temperatures for a short period of time. Compared to U.S. Pat. No. 3,751,569, which shows a very limited solubility for e.g. plant sterol palmitate in a liquid glyceride base oil (0.1%), the presence of a plant stanol and/or sterol fatty acid ester blend with a high level of unsaturated fatty acids clearly enhances the solubility of stanol and/or sterol esters.

In addition, the present invention teaches plant stanol and/or sterol ester compositions usable for direct enrichment of virgin olive oils. Thus, an oil according to the invention can also be obtained by adding the appropriate amount of a plant stanol and/or sterol ester with a fatty acid composition containing more than 60%, preferably more than 65%, polyunsaturated fatty acids, and less than 5% saturated fatty acids. When olive oils which are clear at refrigerator temperatures are desired, a plant stanol and/or sterol ester with a fatty acid composition containing more than 60%, preferably more than 65%, polyunsaturated fatty acids, and less than 5% saturated fatty acids, preferably less than 3%, less than 2%, or most preferably less than 1.5% saturated fatty acids, such as stearic acid, is used. Such stanol and/or sterol fatty acid esters can be obtained by any esterification method known in the art, such as by esterification of a fatty acid blend or a fatty acid alcohol ester blend having the appropriate predetermined fatty acid composition. All percentage values above and throughout the specification are weight-%, unless otherwise indicated.

DESCRIPTION OF THE PREFERRED EMBODIMENTS

The term "virgin olive oils" is meant to include extra virgin olive oil, virgin olive oil, ordinary olive oil and lampante virgin olive oil, all defined according to the Official Journal of the European Communities No. L 39/2 (15.2.1992). In addition, any blend of virgin olive oils with lower grades of olive oils as defined by the Official Journal of the European Communities is covered by this definition. Preferably, such a blend contains at least 25%, more preferably at least 50%, and most preferably at least 75% virgin olive oils.

The term "olive oil based product" is meant to include virgin olive oils, according to the above definition, enriched with a blend of plant stanol and/or sterol fatty acid esters. About 0.3–25 weight- %, preferably about 0.3–10 weight-%, more preferably about 1.5–10 weight- %, and most preferably about 3–10 weight- % of plant stanol and/or sterol fatty acid esters (calculated as free stanols) may be included in the olive oil based product.

The term "high PUFA vegetable oils" is meant to include vegetable oils or vegetable oil blends containing more than 50% polyunsaturated fatty acids and at least 7% saturated fatty acids in fatty acid composition. Typical high PUFA vegetable oils include sunflower oil, corn oil, soybean oil, low saturated soybean oil, safflower oil, cottonseed oil, linola oil or their blends. The amount of saturated fatty acids in the fatty acid composition is typically about 7.5–49%, more preferably about 8–25% and most preferably about 10–20%.

The term "phytosterol" is meant to include 4-desmethyl sterols, 4-monomethyl sterols, and 4,4-dimethyl sterols (triterpene alcohols) or their blends. The term "phytostanol" is meant to include 4-desmetyl stanols, 4-monomethyl stanols and 4,4-dimethyl stanols, and is preferably obtained by hydrogenation of the corresponding phytosterol. Typical 4-desmethyl sterols include sitosterol, campesterol, stigmasterol, brassicasterol, 22-dehydrobrassicasterol, Δ5-avenasterol. Typical 4,4-dimethyl sterols include cycloartenol, 24-metylenecycloartanol and cyclobranol. Typical phytostanols include sitostanol, campestanol and their 24-epimers, cycloartanol and saturated forms obtained by saturation of triterpene alcohols (cycloartenol, 24-metylenecycloartanol and cyclobranol). The terms phytosterol and phytostanol also include all possible natural blends of 4-desmethyl sterol and stanols, 4-monomethyl sterols and stanols, 4,4-dimethyl sterols and stanols and mixtures of natural blends. The terms phytosterol and phytostanol further include any individual 4-desmethyl sterol, 4-monomethyl sterol or 4,4-dimethyl sterol or their corresponding saturated (stanol) forms.

The terms "plant sterol" and "plant stanol" are intended to be synonyms to the terms "phytosterol" and "phytostanol", respectively. "Sterol" and "stanol" shall also mean "phytosterol" and "phytostanol", respectively.

"Polyunsaturated fatty acids" are herein defined as fatty acids containing two or more double bonds. Preferably, the double bonds have cis configuration, but one or more double bonds may be in trans configuration. It is known that many commercially available vegetable oils due to termal isomerisation in the deodorisation process contain a percentage level of polyunsaturated fatty acids containing one or more double bonds with trans configuration. In addition, the double bonds can be either so-called methylene interrupted or conjugated. Typical vegetable oil derived polyunsaturated fatty acids are linoleic, linolenic and γ-linolenic acid, but also polyunsaturated fatty acids from fish oils such as eicosapentaenoic and docosahexaenoic acid can be utilised.

By the term "saturated fatty acids" is meant fatty acids with 4–24 carbon atoms not having any double bonds, thereby including both straight chain and branched fatty acids.

By the term "high PUFA stanol and/or sterol esters" is meant stanol and/or sterol esters produced preferentially with fatty acids from high PUFA vegetable oils, but also fish oil derived polyunsaturated fatty acids or blends of vegetable and fish oil derived polyunsaturated fatty acids can be used.

The stanol and/or sterol fatty acid esters used in the present invention are preferably produced using a food grade process. A "food grade process" is herein defined to include any process whereby the stanol and/or sterol fatty acid ester product is free from residual chemicals which are (1) undesired in the final product because they affect one or more of the qualities of the stanol and/or sterol fatty acid esters, or (2) harmful to a consumer from a food safety standpoint (e.g., the solvents or catalysts contain chlorides). There are a number of food grade processes known in the art, any of which may be suitable for producing the stanol and/or sterol fatty acid esters used in the present invention. Preferably, the food grade process is a solvent free food grade process. The stanol and/or sterol fatty acid esters may be produced by the method described in U.S. Pat. No. 5,502,045, for instance by transesterification of fatty acid alcohol esters obtained from high PUFA vegetable oils or their blends. Alternatively direct, preferably catalytic esterification methods such as those disclosed in U.S. Pat. No. 5,892,068, or enzymatic esterification methods such as those disclosed in EP 195 311 may be used.

Another possibility to produce stanol and/or sterol fatty acid esters is to utilise the excess of high PUFA alcohol esters present in the oily phase obtained after the esterification of high PUFA sterol and/or stanol ester according to the method described in U.S. Pat. No. 5,502,045. This mixture of high PUFA alcohol ester and sterol and/or stanol ester can as such be subjected to a fractionation step to remove higher melting sterol and/or stanol esters.

The stanol esters, sterol esters or their blends can preferably be produced by the method outlined in U.S. Pat. No. 5,502,045 using fatty acid alcohol esters with a predetermined fatty acid composition according to the present invention. The fatty acid alcohol esters can be produced by any process known in the art, such as solvent or detergent fractionation of alcohol fatty acid esters obtained from a high PUFA liquid vegetable oil or blends of high PUFA oils. Corresponding blends of fatty acid alcohol esters can also be obtained by distillation procedures under reduced pressure. Such distillation procedures can preferentially be used to remove saturated fatty acids with 16 or less carbon atoms. Fatty acid alcohol esters with the defined fatty acid compositions can also be obtained by alcoholysis of vegetable oils or oil blends with reduced contents of saturated fatty acids, obtained e.g. according to the U.S. Pat. No. 5,670,348.

The stanol and/or sterol esters with the desired fatty acid composition can also be produced by direct, preferably catalytic esterification methods, e.g. U.S. Pat. No. 5,892,068, between free fatty acids or fatty acid blends of the composition and the stanol and/or sterol. In addition, stanol and/or sterol esters can also be produced by enzymatic esterification e.g. as outlined in EP 195 311.

In addition blends of polyunsaturated fatty acids can be used for obtaining stanol and/or sterol esters with the desired composition.

Stanol esters and/or sterol esters with the desired fatty acid compositions can further be obtained by commercially applied fractionation processes, such as dry, detergent and wet-type fractionation of stanol and/or sterol fatty acid esters obtained by esterification of high PUFA fatty acids derived from e.g. vegetable oil or oil blends by methods based on e.g. the transesterification process outlined in U.S. Pat. No. 5,502,045, any direct preferably catalytic esterification process or by the use of an enzymatic esterification process e.g. as outlined in EP 195 311. Especially fractionation from solvents can be used for preparing desired sterol and/or stanol ester compositions. When using enzymatic esterification processes such as outlined in EP 195 311 the fractionation can preferably be carried out directly in the reaction solvent used in the esterification process after removing the enzyme and possible water phase.

The processes discussed above are just a few of the food grade processes which may be used to manufacture the stanol and/or sterol fatty acid esters in accordance with the invention.

In a preferred embodiment virgin olive oils, preferentially an extra virgin olive oil containing a predetermined blend of stanol and/or sterol fatty acid esters can be obtained by dissolving 5–50 weight-% (preferentially 5–25%) of stanol and/or sterol fatty acid esters obtained by an esterification process such as that disclosed in U.S. Pat. No. 5,502,045, for example by using a high PUFA vegetable oil or a mixture of high PUFA vegetable oils as a source for the fatty acids. This can preferentially be carried out as part of the regular refining process of virgin olive oils. The so-obtained stanol and/or sterol ester olive oil blend is heated and mixed to totally dissolve the stanol and/or sterol esters in the olive oil, after which a conventional "winterizing" step or any fractionation process as known in the art is carried out. For example, a winterizing or batch dry fractionation type of process can be carried out at 0–30° C., preferably at 5–25° C. resulting in olive oil based products being clear at some point in the temperature range of 4–25° C., more preferably at some point in the temperature range of 4–8° C. All the olive oil based products made in accordance with the invention may become clear, in the cases of showing cloudiness at refrigerator temperatures, when removed from refrigeration and stored at room temperature, i.e. at some point in the temperature range of 18–30° C., more preferably at some point in the temperature range of 18–25° C. This means that the olive oil based product of the invention is clear at 30° C. or more, preferably at 25° C. or more, more preferably at 20° C. or more, even more preferably at 18° C. or more. If the product is stored at refrigerator temperatures (i.e., about 2–12° C., preferably about 2–8° C.), it is preferably clear at 8° C., more preferably at 4° C. As European consumers mostly are used to storing the oil at room temperatures, the olive oil based product may preferably be clear at 25° C. or more, more preferably at 20° C. or more, and most preferably at 18° C. or more.

The crystallisation temperature and time can be altered depending on the amount and type of stanol ester and/or sterol ester used and the desired end product. After removing the solid part mainly made up of saturated fatty acids of the stanol and/or stanol ester by e.g. vacuum filtering, the obtained olive oil based product can be used as such or diluted with unprocessed virgin olive oils to obtain the desired content of plant stanol and/or sterol in the olive oil based product. Depending of the quality of the virgin olive oils, some part of the higher melting lipid components naturally contained in the olive oil will simultaneously be removed by the filtering process, and thus the process improves the clarity of the olive oil at refrigerator temperatures (i.e., about 2–12° C., preferably about 2–8° C.). It is obvious to those skilled in the art that any type of fractionation process in addition to the winterizing or batch dry fractionation type of processes can be utilised for crystallising and removing stanol and/or sterol fatty acid esters with higher melting points, e.g. sterol and/or stanol fatty acid esters based on saturated fatty acids. It is also clear to those skilled in the art that any filtration method known in the art can be used.

Another way of producing stanol and/or sterol esters with the desired fatty acid compositions is to utilise the excess of fatty acid methyl ester of the high PUFA sterol and/or stanol ester blend obtained after the transesterification disclosed in U.S. Pat. No. 5,502,045. After the drying step, the stanol and/or sterol ester fatty acid alcohol ester mixture is cooled to 5–25° C., depending on the composition of the stanol and/or sterol ester produced, and the higher melting components are allowed to crystallize for 4–24 hours. Optionally additional fatty acid alcohol ester is added to facilitate the fractionation process. Any fatty acid alcohol ester may be used, but the use of high PUFA alcohol ester is preferred. After filtration, the clear oily phase is preferably deodorised to remove the excess fatty acid alcohol esters and to obtain a tasteless stanol and/or sterol ester. The stanol and/or sterol esters obtained as such can preferably be mixed into the virgin olive oils.

Plant stanol and/or sterol fatty acid esters with the desired fatty acid composition can furthermore be produced from fatty acids or fatty acid alcohol esters with appropriate composition. The so-obtained plant stanol and/or sterol fatty acid esters can be added directly to virgin olive oils to obtain olive oil based products taught by this invention.

In addition stanol and/or sterol ester compositions according to the invention can be produced utilising "fatty acid starting materials" such as fatty acids, fatty acids alcohol esters or oils obtained by processes including e.g. utilising of micro-organisms, enzymes or new breedings of oil producing plants. The sterol and/or stanol part may be obtained from any sterol and/or stanol source, e.g. from the paper pulping industry or from the processing of vegetable oils. New breedings producing elevated amounts or more attractive compositions of suitable sterols and/or stanols produced by conventional methods or genetic modifications are also included as possible raw-materials for the production of stanols and/or sterols. Preferably, the stanol and/or sterols are thereafter utilized in a food grade process to produce the olive oil based product of the invention.

In a preferred embodiment of this invention, virgin olive oils are enriched with plant stanol fatty acid esters with a predetermined fatty acid composition. Also blends of plant stanol and sterol fatty acid esters or plant sterol fatty acid esters can be used.

The following examples are presented in order to disclose the present invention in more detail. All the percentages given are in weight- %.

EXAMPLES

Example 1
Preparation of Stanol Fatty Acid Esters Based on Low Saturated Soybean Oil Fatty Acids (LowSatSoy)

The plant stanol fatty acid esters were produced in a pilot scale. 6 kg plant stanols (composition: 68.2% sitostanol, 28.3% campestanol, 1.1% sitosterol and trace amounts of other unsaturated sterols) obtained by hydrogenation of commercially available plant sterols was blended with 8.6 kg LowSatSoy methyl ester mixture and dried at 110–120° C. The temperature of the dry mixture was reduced to 90–95° C. and the sodium methylate catalyst (73 g) was added. The temperature was increased to 120° C. and the reaction was carried out under vacuum (40 mmHg) for 4 hours. The conversion was monitored by GC analysis. Once >98% conversion was achieved, the temperature was reduced to 100° C. and 30-weight- % hot, >90° C. water was added to destroy the catalyst. The water phase was removed and the oily phase was rewashed to provide a soap content <1,000 ppm. The oily phase was dried at 95° C. and the dry material was bleached using 1 weight- % bleaching aid (Trisyl, Grace, Germany) for 20 minutes at 95° C. under vacuum. After removal of the bleaching aid by filtration, a standard pilot scale deodorization (batch deodorizer, capacity 9 kg) was carried out to remove the excess of soybean oil methyl esters and to obtain a tasteless stanol ester product. The fatty acid composition of the obtained plant stanol ester was as follows: SAFA: 8.7%, MUFA: 27.5% and PUFA: 63.8%. The content of C16:0 and C18:0 was 3.6% for both. The stanol content was 57.6 weight- % with a high esterification conversion (amount of free stanol 1.5 weight- %).

Example 2
Preparation of Vegetable Oil Based Stanol Fatty Acid Ester with Fatty Acids Derived from Linola Oil A stanol fatty acid ester blend with fatty acids derived from linola oil was prepared with same plant stanol blend and method as outlined in Example 1. The fatty acid composition of the obtained plant stanol ester was as follows: SAFA: 10.6%, MUFA: 17.7% and PUFA: 71.8%. The content of C16:0 and C18:0 was 6.2% and 3.9% respectively. The stanol content was 57.9 weight- % with a high esterification conversion (amount of free stanol 0.13 weight- %).

Example 3
Preparation of Plant Stanol Fatty Acid Ester Based on Distilled High PUFA Fatty Acids Derived from Sunflower Oil High PUFA plant stanol esters was produced with similar procedures as outlined in Example 1 with methyl fatty acid esters obtained after distillation of sunflower oil based methyl esters. The combined distillation cuts contained 5.6% SAFA (0.3% C16:0, 5.0% C18:0), 26.5% MUFA and 67.9% PUFA. The total sterol (plant sterol+plant stanol) content of the plant stanol ester was 59.5%, whereas the plant stanol content was 58.4 weight- %. The amount of free stanols was 0.86 weight- %.

Example 4
Preparation of Plant Stanol Ester Enriched Virgin Olive Oil by Crystallisation at +7° C.

7 weight- % of the plant stanol ester (equivalent to 4.0 weight- % of plant stanols and 0.05 weight- % of plant sterols) with fatty acids derived from LowSatSoybean oil produced according to Example 1 was dissolved in extra virgin olive oil (Carlshamn Mejeri, Sweden) by heating the oil to 60° C. and stirring at normal pressure. When all plant stanol ester had dissolved the blend was left to crystallise under slow stirring at +7° C for 21 hours. The oil was filtered by using vacuum (40 mmHg) and thick (carbon) filtration paper used conventionally in winterization processes. The weight of the filtrate was 1.1 weight- % of the initial extra virgin olive oil plant stanol ester blend. The obtained olive oil based product contained 3.7 weight- % plant stanol with 0.12 weight- % plant stanols being in the free form. The fatty acids of the plant stanol ester contained 4.9% saturated fatty acid (2.4% C16:0 and 1.5% C18:0), compared with 8.7% saturated fatty acids in the added plant stanol ester, clearly showing that it was mainly saturated plant stanol esters that crystallised. The plant stanol content of the filtrate was 19.3 weight- % with only 0.18 weight- % plant stanol in the free form. The obtained plant stanol ester enriched virgin olive oil stayed clear at 5° C. for at least 5 days, while clear crystallisation of the glass wall of the bottle could be seen after 3 days in the control extra virgin olive.

Example 5
Preparation of Plant Stanol Ester Enriched Virgin Olive Oil by Crystallisation at 16° C.

A plant stanol ester enriched extra virgin olive oil was similarly prepared as in Example 4, except that the crystallisation was carried out at 1 6° C. for 21 hours. The obtained olive oil based product contained 3.7 weight-% plant stanol with 0.11 weight- % plant stanols being in the free form. The fatty acid composition of the plant stanol ester was 4.5% SAFA (2.3% C16:0 and 1.4% C18:0), 29.0% MUFA and 66.6% PUFA. The weight of the filtrate was 1.5 weight- % of the initial virgin olive oil stanol ester blend. The plant stanol content of the filtrate was 10.7 weight- %, with only 0.1 weight- % as free plant stanol. The fatty acid composition of the plant stanol ester of the filtrate was 36.9% SAFA (18.9% C16:0 and 15.4% C18:0), 19.7% MUFA and 43.4% PUFA. This data clearly shows that mainly saturated fatty acid plant stanol esters are crystallised. The obtained plant stanol ester enriched virgin olive oil stayed clear at 5° C. for at least 5 days, while clear crystallisation of the glass wall of the bottle could be seen after 3 days in the control extra virgin olive oil.

Example 6
Preparation of Plant Stanol Ester Enriched Virgin Olive Oils 7 weight- % of plant stanol ester produced according to Example 2 was dissolved in extra virgin olive oil (Carlshamn Mejeri, Sweden) according to Example 4 and crystallised at 16° C. for 20 hours. The oil sample obtained after filtration was stored in a refrigerator at 7° C. for 24 hours and was found to become cloudy. The sample became clear at room temperature, but started to become cloudy after one day at room temperature, with clear crystal formation after 2 days at room temperature. The obtained olive oil based product contained 3.3 weight- % of plant stanol. The fatty acid composition of the plant stanol ester was 6.0% SAFA, 19.4% MUFA and 74.6% PUFA, compared to source linola stanol ester 10.6% SAFA, 17.7% MUFA and 71.8% PUFA. Based on this data it is clear that a SAFA content of 6% of the fatty acids of the plant stanol ester is too high to obtain the desired properties of the olive oil based product.

Example 7
Preparation of Plant Stanol Ester Enriched Virgin Olive Oils 11 and 16 weight- % of the plant stanol ester obtained in Example 3 was dissolved in extra virgin olive oil (Carlshamn Mejeri, Sweden) and processed according to Example 4. The crystallisation temperatures were +7° C. (20 hours) and +23° C. (7 days) for the 16 weight- % samples and +23° C. (7 days) for the 11 weight- % sample. The 16 weight- % sample crystallised at 7° C. remained clear at 7° C. for at least 1 week. The total stanol content of this olive oil based product was 8.9 weight- % and the fatty acid composition of the plant stanol ester contained in the olive oil based product was 1.7% SAFA (0.65% C16:0 and 0.34% C18:0), 26.8% MUFA and 71.5% PUFA. This olive oil based product can be diluted with unprocessed virgin olive oils to obtain desired plant stanol content of the olive oil based product to commercialise.

The samples crystallized at 23° C. for 7 days became cloudy at 7° C., but both samples became clear at room temperature. The stanol content of the two olive oil based products was 6.3 and 8.9 weight- % for the 11% and 16% samples, respectively.

Example 8
Preparation of Plant Stanol Ester Enriched Virgin Olive Oils 4.5 weight- % of the plant stanol esters obtained in Examples 1, 2 and 3 was dissolved in extra virgin olive oil (Carlshamn Mejeri, Sweden) and stored at 7° C. for 11 h. The olive oil based products enriched with plant stanol ester based on sunflower methyl ester cuts (SAFA: 5.6%; C16:0 0.3%, C18:0 5.0%) showed clear crystallisation at +7° C. and these samples did not become clear at room temperature clearly indicating that the amount of C18:0 stanol ester is too high in this olive oil based product. All three blends also crystallised because the SAFA content was too high (8.7%, 10.6% and 5.6%).

Example 9
Preparation of Plant Stanol Fatty Acid Ester with Desired Fatty Acid Composition by Solvent Fractionation 10 g of the plant stanol ester obtained by the procedure outlined in Example 1 was dissolved in 90 ml n-hexane in a 200 ml centrifuge tube. The mixture was kept at +71° C. for 24 hours, after which the mixture was centrifuged in a temperature programmable centrifuge. The hexane phase was removed and the hexane was evaporated. The obtained plant stanol ester contained 4.6% SAFA (2.4% C16:0 and 1.8% C18:0), 27.2% MUFA and 68.2% PUFA.

Example 10
Preparation of an Olive Oil Based Product Using Plant Stanol Ester with Desired Fatty Acid Composition 7 weight- % of the plant stanol ester obtained from example 9 was dissolved in extra virgin olive oil according a similar procedure as outlined in Example 4 and stored at +71° C. The oil remained clear for at least 7 days.

We claim:

1. An olive oil based product, comprising (1) at least one of the virgin olive oils and (2) a blend of sterol fatty acid esters and/or stanol fatty acid esters, wherein the fatty acid portion of the blend contains less than 5 weight-% saturated fatty acids and more than 60 weight-% polyunsaturated fatty acids, wherein the esters are produced using a food grade process and the blend of sterol fatty acid esters and/or stanol fatty acid esters is present in an amount of about 0.3–25 weight-%, calculated as free sterols and/or stanols.

2. The olive oil based product of claim 1, wherein the blend of sterol and/or stanol fatty acid esters is present in an amount of about 1.5–10 weight-%, calculated as free sterols and/or sterols.

3. The olive oil based product of claim 2, wherein the fatty acid portion of the blend contains more than 65 weight-% polyunsaturated fatty acids.

4. The olive oil based product according to claim 2, wherein the fatty acid portion of the blend contains less than 3 weight-% saturated fatty acids.

5. The olive oil based product according to claim 2, wherein the fatty acid portion of the blend contains less than 2 weight-% saturated fatty acids.

6. The olive oil based product according to claim 2, wherein the fatty acid portion of the blend contains less than 1.5 weight-% saturated fatty acids.

7. The olive oil based product according to claim 2, wherein the product contains at least 25% virgin olive oils.

8. The olive oil based product according to claim 2, wherein the product contains at least 50% virgin olive oils.

9. The olive oil based product according to claim 2, wherein the product contains at least 75% virgin olive oils.

10. The olive oil based product of claim 2, further comprising a vegetable oil or vegetable oil blend containing more than 50% polyunsaturated fatty acids and at least 7% saturated fatty acids.

11. The olive oil based product of claim 1, wherein the blend of sterol and/or stanol fatty acid esters is present in an amount of about 3–10 weight-%, calculated as free sterols and/or stanols.

12. The olive oil based product of claim 1, wherein the fatty acid portion of the blend contains more than 65 weight-% polyunsaturated fatty acids.

13. The olive oil based product according to claim 1, wherein the fatty acid portion of the blend contains less than 3 weight-% saturated fatty acids.

14. The olive oil based product according to claim 1, wherein the fatty acid portion of the blend contains less than 2 weight-% saturated fatty acids.

15. The olive oil based product according to claim 1, wherein the fatty acid portion of the blend contains less than 1.5 weight-% saturated fatty acids.

16. The olive oil based product according to claim 1, wherein the product contains at least 25% virgin olive oils.

17. The olive oil based product according to claim 1, wherein the product contains at least 50% virgin olive oils.

18. The olive oil based product according to claim 1, wherein the product contains at least 75% virgin olive oils.

19. The olive oil based product of claim 1, further comprising a vegetable oil or vegetable oil blend containing more than 50% polyunsaturated fatty acids and at least 7% saturated fatty acid.

* * * * *

UNITED STATES PATENT AND TRADEMARK OFFICE
CERTIFICATE OF CORRECTION

PATENT NO. : 6,827,964 B2
DATED : December 7, 2004
INVENTOR(S) : Wester et al.

It is certified that error appears in the above-identified patent and that said Letters Patent is hereby corrected as shown below:

Title page,
Item [56], References Cited, OTHER PUBLICATIONS, please add the following:
-- Statement of Ilkka Etupaltta, Jan. 18, 2001.
   MIETTINEN et al., "Serum Plant Sterols and Cholesterol Precursors Reflect Cholesterol Absorption and Synthesis in Volunteers of a Randomly Selected Male Population", American Journal of Epidemiology, Vol. 131, No. 1, p. 20-31, 1990.
   PARODI, "Fate of Dietary Sterols in Hydrogenated Oils and Fats", Journal of the American Oil Chemist's Society, Vol. 52, p. 345-348, 1975. --.

Signed and Sealed this

Twenty-second Day of November, 2005

JON W. DUDAS
*Director of the United States Patent and Trademark Office*